US009478038B2

(12) United States Patent
Boriah et al.

(10) Patent No.: US 9,478,038 B2
(45) Date of Patent: Oct. 25, 2016

(54) UNSUPERVISED SPATIO-TEMPORAL DATA MINING FRAMEWORK FOR BURNED AREA MAPPING

(71) Applicants: Shyam Boriah, Cambridge, MA (US); Vipin Kumar, Minneapolis, MN (US); Varun Mithal, Minneapolis, MN (US); Ankush Khandelwal, Minneapolis, MN (US)

(72) Inventors: Shyam Boriah, Cambridge, MA (US); Vipin Kumar, Minneapolis, MN (US); Varun Mithal, Minneapolis, MN (US); Ankush Khandelwal, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 14/673,018

(22) Filed: Mar. 30, 2015

(65) Prior Publication Data
US 2015/0278603 A1  Oct. 1, 2015

Related U.S. Application Data

(60) Provisional application No. 61/972,794, filed on Mar. 31, 2014.

(51) Int. Cl.
| G06K 9/00 | (2006.01) |
| G06T 7/00 | (2006.01) |
| G06K 9/20 | (2006.01) |
| G06K 9/46 | (2006.01) |
| G06K 9/62 | (2006.01) |

(52) U.S. Cl.
CPC ........... *G06T 7/0081* (2013.01); *G06K 9/0063* (2013.01); *G06K 9/209* (2013.01); *G06K 9/4638* (2013.01); *G06K 9/6218* (2013.01); *G06K 9/6256* (2013.01); *G06T 2207/20021* (2013.01); *G06T 2207/30181* (2013.01)

(58) Field of Classification Search
None
See application file for complete search history.

(56) References Cited

U.S. PATENT DOCUMENTS

| 2006/0257031 | A1* | 11/2006 | Abramoff | G06K 9/6277 382/224 |
| 2009/0129654 | A1* | 5/2009 | Huo | G06T 7/0044 382/132 |
| 2009/0262978 | A1* | 10/2009 | Zavagli | G06K 9/3233 382/103 |
| 2009/0315722 | A1* | 12/2009 | Hou | G08B 17/125 340/578 |
| 2010/0034483 | A1* | 2/2010 | Giuffrida | G06T 3/4038 382/284 |
| 2011/0122245 | A1* | 5/2011 | Sinha | G08B 17/005 348/143 |
| 2013/0245429 | A1* | 9/2013 | Zhang | A61B 6/5211 600/424 |
| 2014/0099020 | A1* | 4/2014 | Ko | G06K 9/6262 382/159 |

OTHER PUBLICATIONS

Chen et al ("A NNew Data Mining Framework for Forest Fire Mapping", Conferednce on Intelligent data understanding, 2012).*
Bowman et al., Fire in the Earth System, Science, Livestock Decoded, vol. 324, pp. 481-484, 2009.
(Continued)

*Primary Examiner* — Shervin Nakhjavan
(74) *Attorney, Agent, or Firm* — Westman, Champlin & Koehler, P.A.; Theodore M. Magee

(57) ABSTRACT

A method reduces processing time required to identify locations burned by fire by receiving a feature value for each pixel in an image, each pixel representing a sub-area of a location. Pixels are then grouped based on similarities of the feature values to form candidate burn events. For each candidate burn event, a probability that the candidate burn event is a true burn event is determined based on at least one further feature value for each pixel in the candidate burn event. Candidate burn events that have a probability below a threshold are removed from further consideration as burn events to produce a set of remaining candidate burn events.

32 Claims, 8 Drawing Sheets

(56) References Cited

OTHER PUBLICATIONS

Brakenridge, et al., Global Mapping of Storm Surges and the Assessment of Coastal Vulnerability, Natural Hazards, vol. 66, No. 3, pp. 12-95-1312, 2013.

Carroll et al., Shrinking Lakes of the Arctic: Spatial Relationships and Trajectory of Change, Geophysical Research Letters, vol. 38, No. 20, 2011.

Chen et al., A New Data Mining Framework for Forest Fire Mapping, In Intelligent Data Understanding (CIDU), 2012 Conference, pp. 104-111, IEEE, 2012.

Collins et al., An Assessment of Several Linear Change Detection Techniques for Mapping Forest Mortality Using Multitemporal Landsat TM Data, Remote Sensing of Environment, vol. 56, No. 1, pp. 66-77, 1996.

Coppin et al., Digital Change Detection in Forest Ecosystems with Remote Sensing Imagery, Remote Sensing Reviews, vol. 13, Nos. 3-4, pp. 207-234, 1996.

Coppin et al., Digital Change Detection Methods in Ecosystem Monitoring: A Review, International Journal of Remote Sensing, vol. 25, No. 9, pp. 1565-1596, 2004.

Cretaux et al., Sols: A Lake Database to Monitor in the Near Real Time Water Level and Storage Variations from Remote Sensing Data, Advances in Space Research, vol. 47, No. 9, pp. 1497-1507, 2011.

Crist et al., A Physically-Based Transformation of Thematic Mapper Data—The TM Tasseled Cap, IEEE Transactions on Geoscience and Remote Sensing, vol. GE-22, No. 3, 1984.

Deus et al., Remote Sensing Analysis of Lake Dynamics in Semi-Arid Regions: Implication for Water Resource Management. Lake Manyara, East Africa Rift, Northern Tanzania, Open Access, Water, vol. 5, pp. 698-727, 2013.

Dymond et al., Phenological Differences in Tasseled Cap Indices Improved Deciduous Forest Classification, Remote Sensing of Environment, vol. 80, No. 3, pp. 460-472, 2002.

Foody et al., Sub-Pixel Land Cover Composition Estimation Using a Linear Mixture Model and Fuzzy Membership Functions, International Journal of Remote Sensing, vol. 15, No. 3, pp. 619-631, 1994.

Gao et al., Global Monitoring of Large Reservoir Storage from Satellite Remote Sensing, Water Resources Research, vol. 48, W09504, 12 pages, 2012.

Giglio et al., An Active-Fire Based Burned Area Mapping Algorithm for the MODIS Sensor, Remote Sensing of Environment, vol. 113, No. 2, pp. 408-420, 2009.

Gislason et al., Random Forests for Land Cover Classification, Pattern Recognition Letters, vol. 27, pp. 294-300, 2006.

Huang et al., An Assessment of Support Vector Machines for Land Cover Classification, International Journal of Remote Sensing, vol. 23, No. 4, pp. 725-749, 2002.

Justice et al., MODIS-Derived Global Fire Products, In B. Ramachandran, C.O. Justics, and M.J. Abrams, Editors, Land Remote Sensing and Global Environment Change, Springer, pp. 661-679, 2011.

Kaptue et al., Characterization of the Spatial and Temporal Variability of Surface Water in the Soudan-Sahel Region of Africa, Journal of Geophysical Research: Biogeosciences, vol., 118, No. 4, pp. 1472-1483, 2013.

Karpatne et al., Predictive Learning in the Presence of Heterogeneity and Limited Training Data, In Statistical Analysis and Data Mining. SIAM, pp. 253-261, 2014.

Kendall, A New Measure of Rank Correlation, Biometrika, vol. 30, Nos. 1-2, pp. 81-93, 1938.

Keshava et al., Spectral Unmixing. Signal Processing Magazine, IEEE, vol. 19, No. 1, pp. 44-57, 2002.

Koller et al., The Bayesian Network Representation, Probabilistic graphical models: Principles and Techniques, MIT press, Chapter 3, pp. 43-92, 2009.

Liu et al., A Spatial-Temporal Modeling Approach to Reconstructing Land-Cover Change Trajectories from Multi-Temporal Satellite Imagery, Annals, of the Association of American Geographers, vol. 102, No. 6, pp. 1329-1347, 2012.

Lobser et al., MODIS Tasselled Cap: Land Cover Characteristics Expressed Through Transformed MODIS Data, International Journal of Remote Sensing, vol. 28, Nos. 21-22, pp. 5079-5101, 2007.

Lu et al., A Survey of Image Classification Methods and Techniques for Improving Classification Performance, International Journal of Remote Sensing, vol. 28, Nos. 5-6, pp. 823-870, 2007.

Lu et al., Change Detection Techniques, International Journal of Remote Sensing, vol. 20, pp. 2365-2407, 2004.

Massey, Jr., The Kolmogorov-Smirnov Test for Goodness of Fit, Journal of the American Statistical Association, vol. 16, No. 253, pp. 68-78, 1951.

Mithal et al., Monitoring Global Forest Cover Using Data Mining, ACM Transactions on Intelligent Systems and Technology (TIST), vol. 2, No. 4, 36, 2011.

Neill et al., Rapid Detection of Significant Spatial Clusters, In Proceedings of the Tenth ACM SIGKDD International Conference on Knowledge Discovery and Data Mining, pp. 256-265, 2004.

Pan et al., A Survey on Transfer Learning, IEEE Transactions on Knowledge and Data Engineering, vol. 22, No. 10, pp. 1345-1359, 2010.

Pang-Ning et al., Introduction to Data Mining, WP Co., pp. 1-165, 2006.

Potere et al., Mapping Urban Areas on a Global Scale: Which of the Eight Maps now Available is More Accurate?, International Journal of Remote Sensing, vol. 20, Nos. 23-24, pp. 6531-6558, 2009.

Ricko et al., Intercomparison and Validation of Continental Water Level Products Derived from Satellite Radar Altimetry, Journal of Applied Remote Sensing, vol. 6, pp. 1-23, 2012.

Sawaya et al., Extending Satellite Remote Sensing to Local Scales: Land and Water Resource Monitoring Using High-Resolution Imagery, Remote Sensing of Environment, vol. 88, pp. 144-156, 2003.

Settle et al., Linear Mixing and the Estimation of Ground Cover Proportions, International Journal of Remote Sensing, vol. 14, No. 6, pp. 1159-1177, 1993.

Settles, Active Learning Literature Survey, University of Wisconsin, Madison, 52:55-66, 2010.

Tango et al., A Flexibly Shaped Spatial Scan Statistic for Detecting Clusters, International Journal of Health Geographies, vol. 4, No. 1, pp. 1-15, 2005.

US Geological Survey and NASA, Land Processes Distributed Active Archive Center (LP DAAC). http://lpdaac.usgs.gov.

U.S. Department of Agriculture, Global Reservoir and Lake (GRLM), http://www.pecad.fas.usda.gov/cropexplorer/global_reservoir/, 2015.

Vorosmarty, et al., Global Water Resources: Vulnerability from Climate Change and Population Growth, Science, vol. 289, No. 5477, pp. 284-288, 2000.

* cited by examiner

UNSUPERVISED SPATIO-TEMPORAL DATA MINING FRAMEWORK FOR BURNED AREA MAPPING

CROSS-REFERENCE OF RELATED APPLCIATION

The present application is based on and claims the benefit of U.S. provisional patent application Ser. No. 61/972,794, filed Mar. 31, 2014, the content of which is hereby incorporated by reference in its entirety.

This invention was made with government support under IIS-1029711 awarded by the National Science Foundation (NSF), and NNX12AP37G awarded by the National Aeronautics and Space Administration (NASA). The government has certain rights in the invention.

BACKGROUND

Biomass burning is a major source of greenhouse gas emissions and often has a significant footprint on flora, fauna and air quality. Thus, accurate and cost-effective fire mapping techniques are necessary for understanding the frequency and distribution of forest fires. While monitoring fires in near-real time is critical for operational fire management, mapping historical fires (i.e. burned areas) is also important for a number of reasons, such as climate change studies (e.g., studying the relationship between rising temperatures and frequency of fires), and carbon cycle studies (e.g., quantifying how much $CO_2$ is emitted by fires is critical for emissions reduction efforts such as UN-REDD). There are two primary approaches for mapping large-scale burned areas: (1) field-based surveys combined with aerial observations, which allow extremely detailed burned area mapping, but are limited in their spatial extent and temporal frequency because of their high cost, and (2) satellite remote sensing-based techniques, such as those from NASA's Moderate Resolution Imaging Spectroradiometer (MODIS) instrument, which offer the most cost-effective data for mapping burned areas. MODIS data sets are available freely with regular, global wall-to-wall coverage and offer interesting opportunities to develop novel spatio-temporal data mining algorithms for classification (event detection) that produce reliable and timely burned area products.

Broadly there are two paradigms to mine useful information from large data sets-supervised learning and unsupervised learning. Supervised learning approaches are widely used for land classification from remote sensing data. Supervised approaches use labeled training data samples to train classification models such as decision trees, random forests, logistic regression or support vector machines on multi-spectral or hyper-spectral remotely sensed imagery data. However, there are several data-centric challenges in using supervised learning approaches for the task of burned area mapping. Fires are a rare event and therefore collecting sufficient labeled training data requires significant effort. Moreover, the multi-spectral data for the burned locations is distributed differently in different seasons, geographical locations and land cover classes. Due to the seasonal, geographical and land cover heterogeneity in data, classifiers trained using training data samples obtained from a particular season/geography/land cover show poor classification accuracy when used to classify pixels of a different season/geography/landcover. Training separate classifiers for each combination of season, geography and land cover class would explode the number of training samples needed thereby making supervised approaches infeasible for global scale burned area mapping. In contrast to supervised learning approaches, unsupervised learning approaches do not use labeled examples—instead they exploit prior biases about the form of input data and expected output.

The bulk of work done in the past in land classification includes pixel-based approaches that use spectral features of each pixel to classify it to a surface cover class such as water, forest, grass and burnt, for example. These approaches ignore the spatial context during the classification process.

As an illustrative example, FIG. 1 shows a spatial region where each pixel is assigned a score between 1 and 5 under the prior art. Higher score implies greater probability of being part of an event. In FIG. 1, dark shaded area 102 represents locations that are not part of an event and light shaded regions 104, 106 and 108 represent locations that are part of the event. The numbers represent individual pixel feature values with higher pixel feature values being representative of an event. Numbers that are not surround by small shaded boxes, such as numbers 110 and 112 , are locations that were not identified as part of the event under the prior art, while numbers surrounded by small shaded boxes, such as numbers 114 and 116, are locations that were identified as part of the event under the prior art. FIG. 1 shows that classifying each pixel independently (by using a threshold of 3) misses some pixels, such as pixel 112, that are part of the event and also identifies some spurious pixels, such as pixel 114.

SUMMARY

A method reduces processing time required to identify locations burned by fire by receiving a feature value for each pixel in an image, each pixel representing a sub-area of a location. Pixels are then grouped based on similarities of the feature values to form candidate burn events. For each candidate burn event, a probability that the candidate burn event is a true burn event is determined based on at least one further feature value for each pixel in the candidate burn event. Candidate burn events that have a probability below a threshold are removed from further consideration as burn events to produce a set of remaining candidate burn events.

In a further embodiment, a method is provide for identifying which pixels in a satellite image are part of a burn event. The method includes receiving an initial grouping of pixels that groups pixels into at least one candidate burn event, wherein each pixel in a candidate burn event is considered to be part of a contiguous burned area. An initial fire probability is assigned to each candidate burn event based on at least one input feature of the pixels grouped in each candidate burn event. The initial fire probabilities are then used to select training burn events to train a classifier. The classifier is trained based on at least one additional input feature for each pixel of the training burn events to form a trained classifier. The trained classifier is used to assign a refined fire probability to each candidate burn event. Candidate burn events that have a refined fire probability below a threshold are removed to form a refined set of candidate burn events.

A system includes a memory containing initial groupings of pixels into candidate burn events and a processor. The processor assigns an initial fire probability to each candidate burn event based on a subset of features and uses the initial fire probabilities to train land cover-specific classifiers. The processor then uses the trained land cover-specific classifiers to assign a refined fire probability to each candidate burn event. The processor removes candidate burn events that have a refined fire probability below a threshold to form a refined set of candidate burn events.

DETAILED DESCRIPTION

In embodiments below, a hybrid approach is provided that leverages unsupervised learning together with supervised techniques to address classification tasks without using any labeled data. Specifically, embodiments below provide a region-based approach that incorporates spatial context more effectively for event detection. This approach classifies spatial regions (spatially contiguous set of pixels) instead of classifying each pixel individually. The advantage of using a region-based approach is that classification model can consider both the region-level properties such as size of the event together with the distribution of the data features of the member pixels to classify each region.

In the various embodiments, an unsupervised spatio-temporal data mining framework is used to solve the important problem of burned area mapping which has societal relevance. The framework uses domain heuristics and observations about burned areas for learning a classification model for burned area mapping. Moreover, the framework uses a region-based classification approach that leverages the spatial context of burned areas and outputs a more accurate and exhaustive burned area map than traditional pixel-based classification.

The various embodiments show robustness across spatial regions with different geographical, land cover and climatic conditions.

Figure 1:
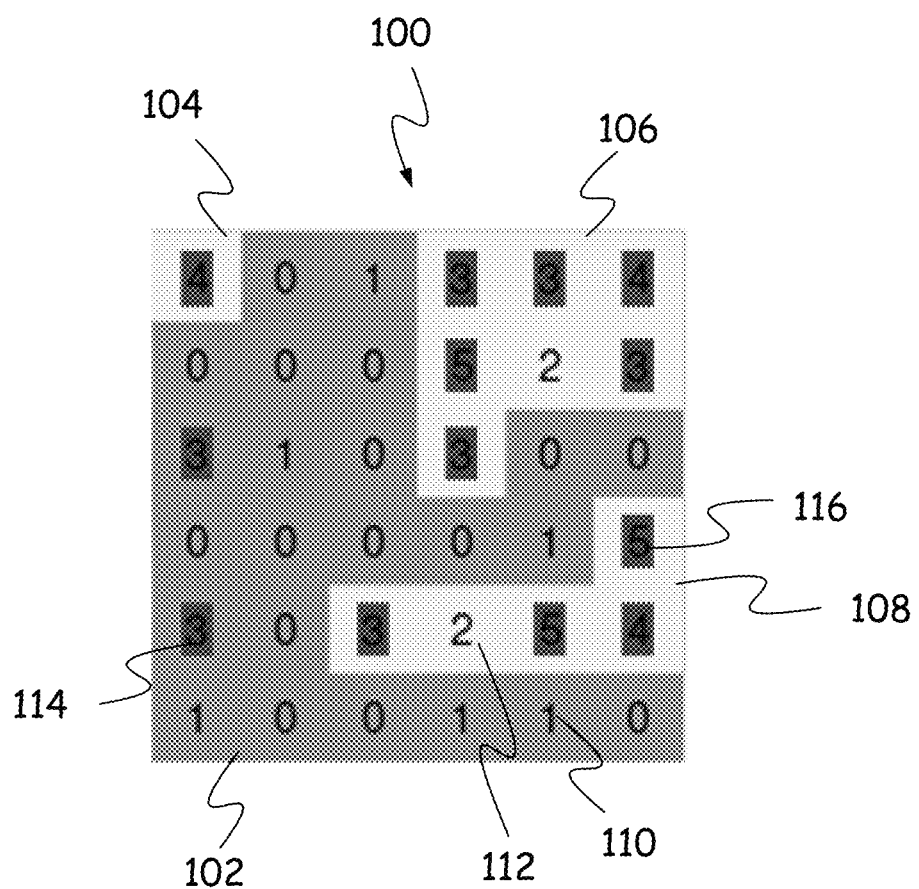
FIG. 1 provides a graph showing pixel labelling under the prior art.
Figure 2:
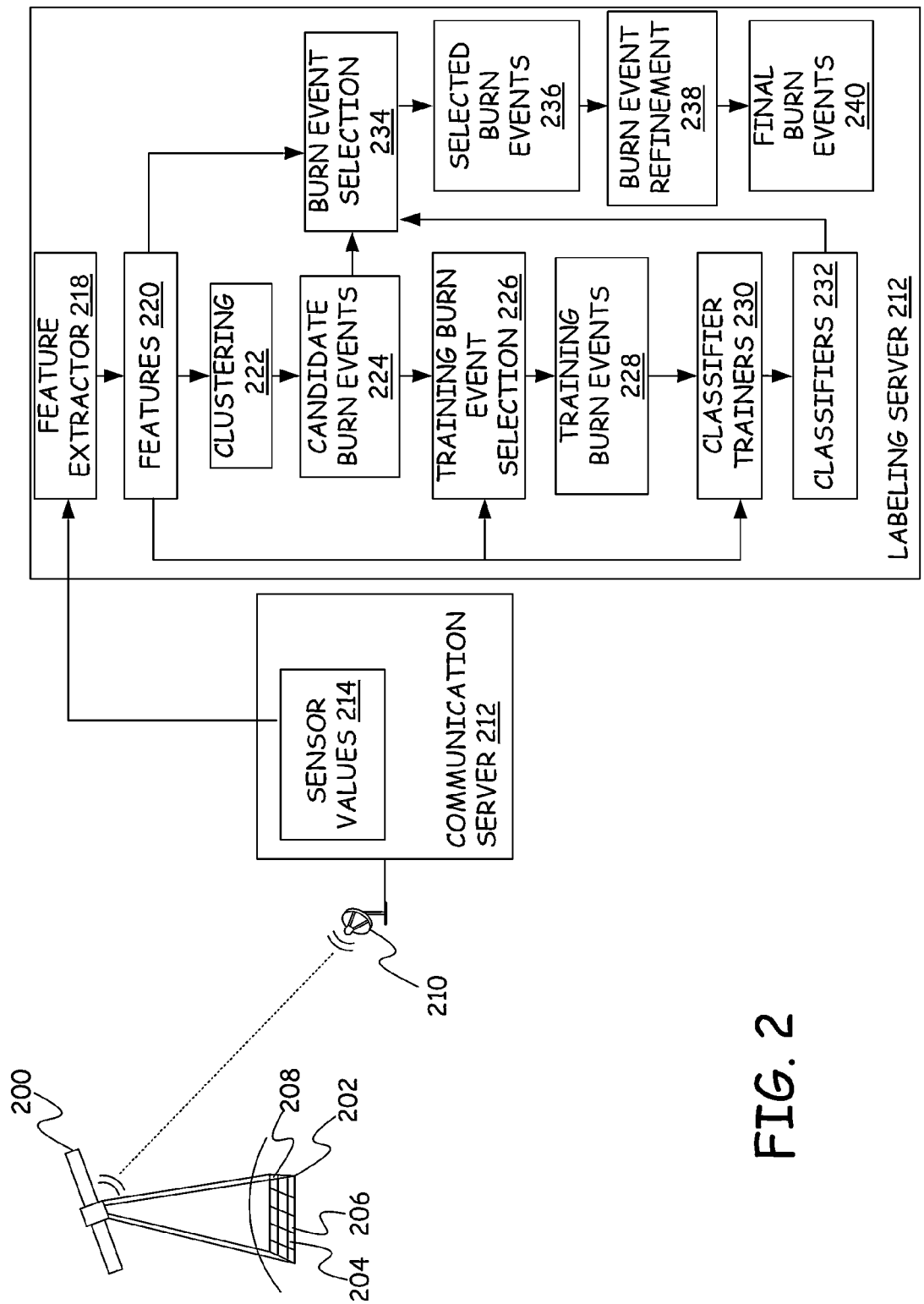
FIG. 2 provides a system diagram of a system for labelling satellite sensor data.

FIG. 2 provides a system diagram of a system used to improve the efficiency and accuracy of labeling satellite sensor data. In FIG. 2, a satellite 200, positioned in orbit above the earth and having one or more sensors, senses values for a geographic location 202 that is comprised of a plurality of sub-areas such as sub-areas 204, 206 and 208. Multiple sensors may be present in satellite 200 such that multiple sensor values are generated for each sub-area of geographic location 202. In addition, although only a single satellite is shown in FIG. 2, in other embodiments, multiple satellites may be used. Satellite 200 transmits the sensor values to a receiving dish 210, which provides the sensor values to a communication server 212. Communication server 212 stores the sensor values as sensor values 214 in a memory in communication server 212. A labeling server 216 receives sensor values 214 and provides the received sensor values to a feature extractor 218. Feature extractor 218 extracts one or more features 220 for each sub-area based on the sensor values for that sub-area.

Although feature extractor 218 is shown as part of labeling server 216 in FIG. 2, in other embodiments, feature extractor 218 is part of communication server 212 and features 220 are provided by communication server 212 to labeling server 216. For example, global remote sensing datasets are available from a variety of sources at different resolutions. The proposed fire mapping framework is based on two remotely-sensed composite data products from the MODIS instrument aboard NASA's Terra satellite, which are available for public download. Specifically, some embodiments use the Enhanced Vegetation Index (EVI) from the MODIS 16-day Level 3 1km Vegetation Indices (MOD13A2) and the Active Fire (AF) from the MODIS 8-day Level 3 1km Thermal Anomalies and Fire products (MOD14A2). EVI essentially measures "greenness" (area-averaged canopy photosynthetic capacity) as a proxy for the amount of vegetated biomass at a particular location. AF is a basic fire product designed to identify thermal anomalies from the middle infrared spectral reflectance bands and is used heavily in operational situations by fire-fighting agencies around the world. Moreover, some embodiments use MODIS land cover classification product (MCD12Q1) to get the land cover class of each pixel. MODIS Level 3 products are provided on a global 1km sinusoidal grid. In the discussion below, subsets of the data corresponding to geographical regions are focused on because of the availability of validation data, however, the embodiments are not limited to these subsets of data.

Burned Area Characteristics

In this section, some key characteristics of burned areas that help in distinguishing them from unburned regions are discussed. However, often real burned regions (or parts of a burned region) will not exhibit some of these properties. Similarly, unburned regions and non-fire related land change events may also exhibit some of these properties. It is therefore imperative for a burned area mapping framework to account for the uncertainty and the weak relationship between the features and classes (burned or unburned).

Observation 1: Active Fire Burned areas show significant rise in temperature at the time of fire. To exploit this property, some embodiments use MODIS Active Fire (AF) product as one of the features. AF is a boolean variable that is true if a severe temperature anomaly is observed at a pixel on a given time step and false otherwise. Burned pixels are more likely to have an Active Fire signal on the date of fire compared to other unburned pixels. However, as mentioned earlier, there is uncertainty associated with using AF as surrogate for fire mapping. For example, in California the coverage of AF varies between 80-90% which implies that 10-20% of burned area does not have an AF signal. Similarly, the precision of AF in Georgia is only 10% which implies 90% of pixels with AF are not real burns.

Figure 4:
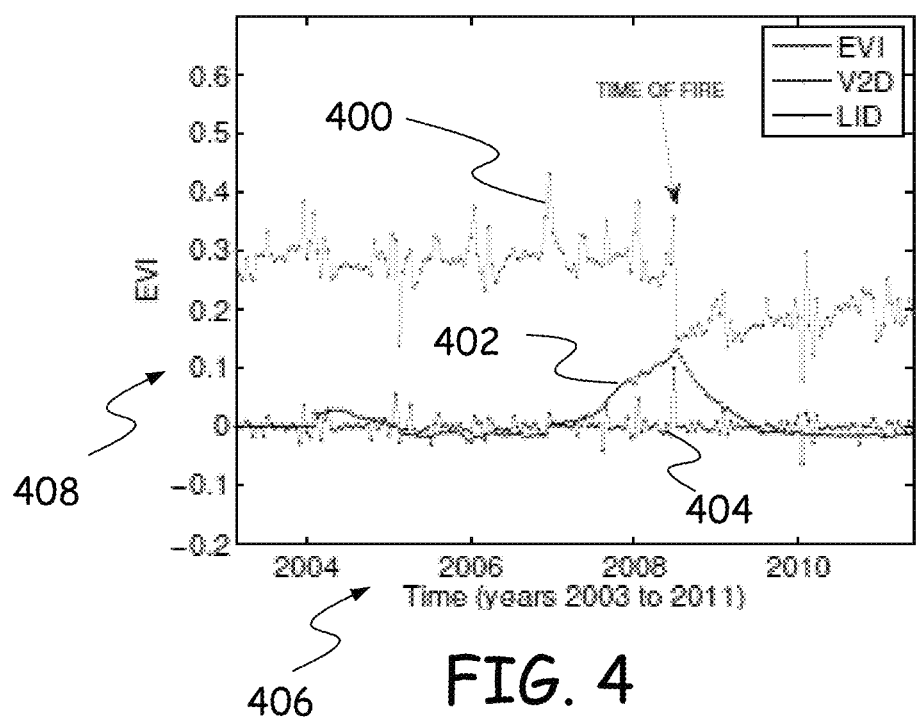
FIG. 4 provides graphs of feature values over time.

Observation 2: Vegetation index change Fire events burn down the leaf mass and are therefore expected to significantly decrease the vegetation index value (EVI) of the burned locations. Some embodiments use two EVI time series features to quantify the vegetation index change at any given time step. Vegetation Difference score V2D is a vegetation index change statistic computed based on the significance of the change in annual mean of vegetation index at the current time step. V2D score is expected to be higher when the EVI of the location is significantly lower for an entire year compared to the observed EVI for previous years such as in case of fire locations. Local Instance Delta score, LID, is a vegetation index change statistic computed based on the significance of the change in vegetation index between two consecutive time steps. Since fire events cause an abrupt loss in EVI, LID score is expected to be high for burned pixels at time of fire. FIG. 4 shows the EVI time series 400 of a burned location and the time series of two vegetation index difference features-V2D 402 and LID 404 for the same location at every time step. The arrow points to the date of fire. Time is shown along horizontal axis 406 and EVI values are shown along vertical axis 408.

Similar to AF, the vegetation index difference features also have high uncertainty and only a weak relationship with a burned class. For example, a burned location may not exhibit a significant V2D or LID or both due to noise in the data or the nature of land cover that got burned. Land cover classes such as grasslands and shrubs often show only small changes in vegetation index on being burned and can be difficult to detect from 16 day EVI data. Moreover, unburned areas or some other land changes not related to fire such as deforestation may also show a high vegetation index change (V2D or LID).

Observation 3: Temporal texture In FIG. 4, the V2D 402 (LID 404) score at the time step of fire is the highest among the rest of the time series. Some embodiments expect that the values of V2D 402 (LID 404) at the time of a fire is the highest in the entire time series. This property of burned areas is referred to herein as temporal texture. Note that this property does not depend on the actual value of the V2D 402 (LID 404) score but instead only depends on the rank of the V2D 402 (LID 404) value in the entire time series. Thus it is possible that the V2D 402 score of a burned pixel at time of fire is not sufficiently high to be considered as burned, but the V2D 402 score is still the highest. The temporal texture property therefore can be useful even in the absence of understanding about what score value is significant. Often there are multiple fires in different years at the same location. If we look for highest V2D 402 (LID 404) at each location then we can find only one fire per location. To avoid missing multiple fire events at a same location, some embodiments expect that the V2D 402 (LID 404) score at the time step of fire events should be highest in a local temporal neighborhood of 2 years (instead of being highest in the entire time series).

Observation 4: Spatial proximity Fire events typically span multiple spatially contiguous pixels. Previous methods have leveraged this property to improve the coverage of burned areas by detecting missed burned pixels in the spatial proximity of the already identified pixels. Though fires tend to burn multiple spatially co-located pixels, a threshold for the size of the fire events will be inappropriate as there are small fires that span only a few pixels but are of interest.

Observation 5: Land cover based heterogeneity Different land cover classes in the same spatial region such as shrubs, grasslands and forests can vary in their vegetation phenology, moisture content and fire conditions. This may lead to significant differences in the remote sensing signals from different land cover classes. To account for this heterogeneity, a fire classification algorithm should use different model parameters for different land cover classes. For example, if a vegetation index decrease (above a threshold) is used as a feature to distinguish burned areas from unburned areas, then land cover specific thresholds should be used.

Approach Overview

Pixel-based approach In some embodiments, the following 5 features are provided as input: AF, V2D, LID and temporal texture of V2D and LID score. Perhaps the most intuitive approach to solve the fire mapping problem is to treat each (pixel,time) as a data instance with a 5 dimensional feature vector and try learning a discriminative model such as logistic regression to distinguish between unburned and burned instances. As discussed earlier, this approach is infeasible at global-scale due to scarcity of representative training samples for supervised learning.

Region-based approach Region-based approaches classify spatial regions (spatially contiguous set of pixels) instead of classifying each pixel. The advantage of using a region-based approach is that the classification model can consider both the region-level properties such as size of the event together with the distribution of the data features of the member pixels to classify each region. Typically, in scenarios such as fire classification where the features are weak, uncertainty of classification at pixel level will be higher compared to uncertainty of classifying by looking at aggregate region-based features. For example, consider a region of 100 pixels out of which we are certain about the classification of only 60 pixels, i.e., they have a clear evidence of fire. The remaining 40 pixels however, have lower certainty (say a probability of 0.3) of fire. When looking at this region and trying to classify the region as a single unit, the embodiments will be confident that there is a fire in this region. Thus, the 60 confident pixels part of the event boost the probability of the 40 uncertain pixels.

There are several significant challenges in using region-based classification paradigm. For a 1000×1000 image, the number of rectangular regions is $\sim 10^{12}$ and the number of regions of arbitrary shape and size is much higher. Thus, an exhaustive search to find all regions of high posterior probability is computationally infeasible. The other and perhaps the more important challenge posed by the large number of regions is the increase in false alarms due to the multiple testing problem. To make region-based approaches computationally feasible, a method (using some heuristics) to find a smaller set of candidate regions from the set of all possible regions can be used. The expectation is that the set of candidate regions will have a high recall since some embodiments are going to assign probability to only these candidate regions and any event not part of the candidate regions will be missed. In principle, the region-based approaches should be able to work with some spurious candidates which should be assigned a low event probability by the model.

Since the initial set of candidates are being chosen using a semi-correct heuristic, it is very likely that the regions are corrupted, i.e., a candidate event has some pixels that are part of a true event together with other pixels that are not part of any true event. Under some embodiments, the framework classifies this candidate region as burned so that the part belonging to the true burned event is identified, but this will also lead to misclassifying the spurious members of the candidate region as positives. To avoid this issue, a candidate refinement phase is proposed where some embodiments modify the event candidate membership. Ideally, this step will remove any spurious members from a candidate event. Similarly, since the candidate region only covers part of a true event, the candidate event refinement step should include the pixels which are initially missed.

Problem Statement

Input Data:

(1) Spatial network $G_s$ where vertices are pixels and edges exist between spatially adjacent pixels.

(2) Land cover class for each pixel (3) Real-valued vegetation index difference scores (V2D and LID) for each pixel (i.e. score values $v2d_i^k$ and $lid_i^k$ at each time step k, for each pixel i)

(4) Boolean Active Fire signal for each pixel (i.e. AF signal $af_i^k$ at each time step k, for each pixel i)

(5) Candidate (incorrect and inexhaustive) burned pixels at each time step k.

Output:

Assign each pixel to either fire event or not fire event class at each time step.

Objective:

Each burned pixel should be assigned to fire event class on the date of fire. On all other dates it should be assigned to not fire event class.

Details of Various Embodiments

Figure 3:
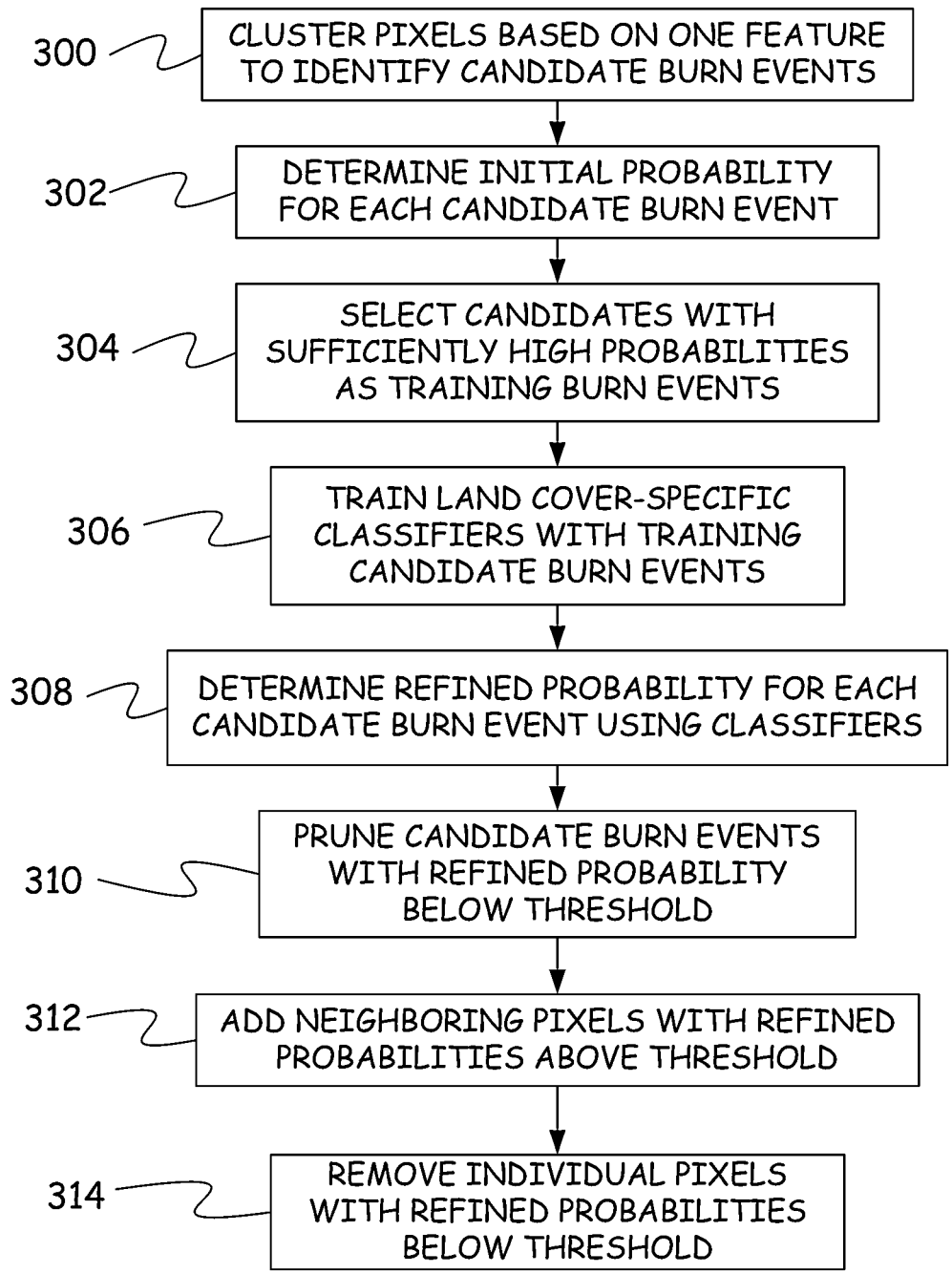
FIG. 3 provides a flow diagram of a method for labelling satellite sensor data.

FIG. 3 provides a flow diagram of a method of assigning labels to satellite sensor data in the various embodiments.

In step 300, pixels of the satellite sensor data are clustered based on one of the features 220 by a clustering unit 222. These clusters are an incorrect and inexhaustive set of candidate burned areas. In some embodiments, AF presence is the feature used to cluster the pixels at step 300. The candidate burned areas (pixels) are grouped based on spatial neighborhood (graph $G_s$) to form candidate burned events 214. FIG. 5(a) shows a true event with areas 500 and 502 being burn events with boundaries 504 and 506 between the burn events and an area 508 outside of the burn events. FIG. 5(b) shows the input candidate burn events 224 created using AF with areas 510 and 512 having AF values of True and area 514 having AF values of false. FIG. 5(c) shows candidate burn events 224 with spurious noise added to test the performance of the various embodiments as discussed further below.

In step 302, an initial fire probability is assigned to each of the input candidate burned events 224 by a training burn event selection unit 226. In accordance with one embodiment, selection unit 226 determines the initial fire probability based on the AF and temporal texture of its member pixels. At step 304, selection unit 226 selects candidate burn events with sufficiently high initial probabilities to be used as training burn events 228 by classifier trainers 230. In particular, classifier trainers 230 use training burn events 228 to train classifiers 232 at step 306. In accordance with one embodiment, classifiers 232 use V2D and LID features to classify pixels as either being part of a burn event or not being part of a burn event. In accordance with one embodiment, classifiers are trained for each land cover class by using the pixels of training burn events 228 assigned to each land cover class to train the respective classifier for that land cover class.

In step 308, a burn event selection unit 234 uses classifiers 232, which in one embodiment are V2D and LID classifiers, and features 220, such as AF and temporal texture for example, to assign a refined fire probability to each candidate burned event. At step 310, burn event selection unit 234 prunes candidate burn events 224 by removing candidate burn events with refined fire probabilities below a threshold to thereby form selected burn events 236. Most of the incorrect (false positive) input candidate events get pruned in step 310 as they are assigned a very low fire probability.

At step 312, a burn event refinement unit 238 refines selected burn events 236 by adding neighboring burned pixels that are missed in the input candidate event. In particular, the refined fire probabilities of each pixel that neighbors a selected burn event 236 is compared to a threshold and is added to the selected burn event 236 if the probability is above the threshold. In some embodiments, step 312 is performed iteratively such that after adding neighboring pixels to a burn event, new neighboring pixels are identified for the newly added pixels and the refined fire probability of the new neighboring pixels is examined to see if the new neighboring pixels should be added to the selected burn event.

At step 314, the refined fire probabilities of individual pixels in each refined burn event are examined to see if the probabilities are below a threshold. If the refined fire probabilities are below the threshold the corresponding pixels are removed from the refined burn event to form final burn events 240.

Figure 5D:
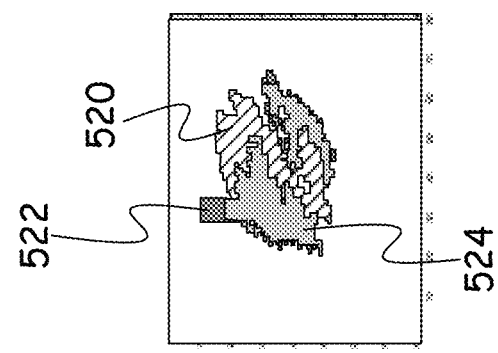
FIG. 5d provides a graph showing final candidate burn events.
Figure 5C:
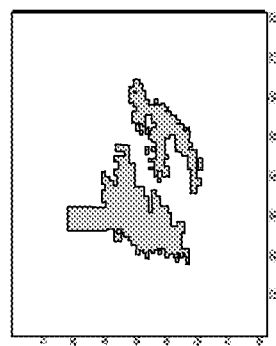
FIG. 5c provides a graph showing the candidate burn events of FIG. 5b with spurious pixel noise.
Figure 5B:
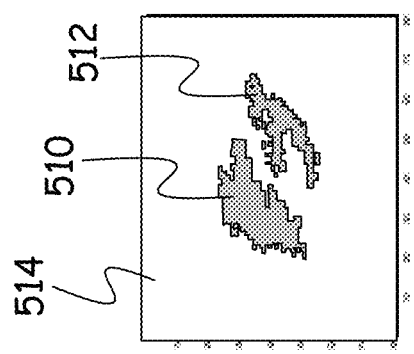
FIG. 5b provides a graph showing candidate burn events before refinement.
Figure 5A:
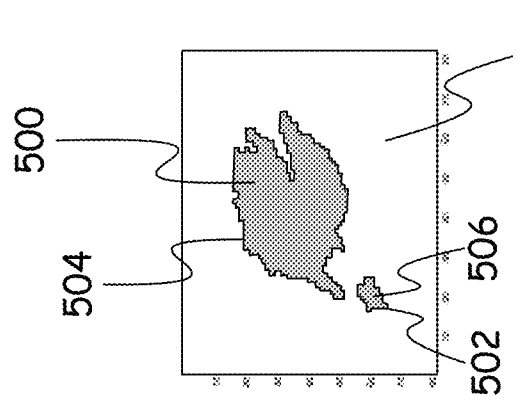
FIG. 5a provides a graph of true burn events.

FIG. 5(d) shows how the missed pixels are added and spurious pixels are removed from a candidate event in successive iterations.

The rest of this section discusses the details of each step.

Fire Probability Model for Candidate Events

Figure 6:
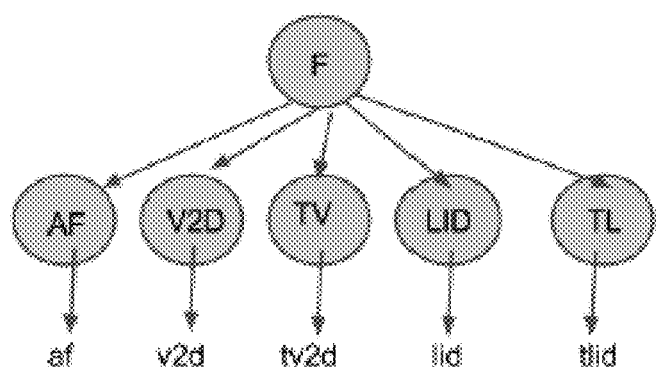
FIG. 6 shows a probabilistic graphical model for assigning a fire probability to a candidate event.

FIG. 6 shows a probabilistic graphical model for assigning a fire probability to each candidate event. F corresponds to the boolean variable for fire: 1 implies the event cluster corresponds to a fire event and 0 implies no fire event.

The observed data is a set of 5 boolean variables observed for each pixel in an image (single time step)—active fire ($af_i$), significant annual change ($v2d_i$), v2d score is highest at the time of consideration ($tv2d_i$), significant local change ($lid_i$), and local change is highest at the time of consideration ($tlid_i$).

The graphical model assigns a fire probability to each candidate event based on the observed data of each member pixel of that event, i.e. Prob(F=1|data). This region-based classification model allows better estimation of event probability based on cumulative statistics of member pixels and therefore is more effective in dealing with high uncertainty in the data. Below, the evaluation section shows that this event-centric model shows better performance compared to models that assign probability to each pixel independently.

Some of the embodiments utilize 5 latent boolean variables corresponding to each of the 5 characteristics—active fire ($AF_j$), high annual change ($V2D_j$), v2dscore is highest in the temporal neighborhood ($TV_j$), high local change ($LID_j$), and local change is highest in temporal neighborhood ($TL_j$) for each event j that indicate whether the corresponding characteristic is present or absent in the candidate event. For any candidate event to be assigned a high fire probability, i.e., probability that F=1 is very high, all 5 latent variables should be true. If only a partial subset of the mentioned properties are present then the probability of the candidate being fire decreases. The final probability of fire is assigned to each event based on the probabilities of the 5 characteristics being present in the event.

To compute the probability of each of the 5 characteristics for a given candidate event, some embodiments assume that for each event j of size $N_j$ the total occurrences of the observed boolean variables follows a Binomial distribution with parameter p. Some embodiments further assume that when the characteristic is present, p is drawn from a Beta distribution with hyperparameters $\alpha_e$ and $\beta_e$ and when it is absent p is drawn from a Beta distribution with hyperparameters $\alpha_{ne}$ and $\beta_{ne}$.

$\Sigma af_i \sim Bin(N_{j,p})$ $\Sigma v2d_i \sim Bin(N_{j,p})$ $\Sigma tv2d_i \sim Bin(N_{j,p})$ $\Sigma \text{lid}_i \sim \text{Bin}(N_{j,p})$
$\Sigma \text{tlid}_i \sim \text{Bin}(N_{j,p})$
where $N_j$ is the size of the event cluster and $p \sim \text{Beta}(\alpha_e, \beta_e)$ or $p \sim \text{Beta}(\alpha_{ne}, \beta_{ne})$ based on whether the corresponding property latent variable is active or not.

Posterior Probability Computation $$P(F=1 | \text{data}) = \frac{\prod_{i=\ldots 5} \sum_{v_i=0,1} P(\text{data} | V_i) P(V_i | F=1)}{\sum_{f=0,1} \prod_{i=1\ldots 5} \sum_{v_i=0,1} P(\text{data} | V_i) P(V_i | F=f)}$$

where $V_i$'s are the 5 characteristics—AF, V2D, LID, TV and TL.

Parameter estimation The model has 10 parameters—2 for each of the five features. For each feature (AF, V2D, LID, TV and TL) the model estimates $P(V_i|F=1)$ and $P(V_i|F=0)$ using maximum likelihood estimation.

Hyperparameters The model has 4 hyperparameters—$\alpha_e$, $\beta_e$, $\alpha_{ne}$ and $\beta_{ne}$. Some embodiments assume that for a true event, the number of pixels showing a characteristic will be higher compared to the number of pixels showing that characteristics for a similar size non-event. In some embodiments, the hyperparameters are fixed to reflect this assumption and use the following setting: $\alpha_e=2$, $\beta_e=1$, $\alpha_{ne}=1$ and $\beta_{ne}=4$.

Assigning initial fire probability In Step 302, it is not known if the observed vegetation difference scores of the pixel are significant or not. Thus, the model treats v2d and lid as missing variables and an initial fire probability is assigned to each candidate event based on the number of active fire of and the temporal texture boolean features tv2d and tlid. This step allows an initial filtering of potential false candidate events in the input set and the high probability candidates are used as positive training samples while learning the classifiers for the vegetation difference scores.

Learning classifiers on V2D and LID In steps 304 and 306, positive and negative training samples are collected and then a classifier is trained using supervised learning. In some embodiments a logistic regression classifier is trained (though other classifiers such as SVM can also be used). Selection of training samples is based on output of Step 302, i.e., the initial fire probabilities assigned based on AF, TV and TL. V2D and LID data from locations at given time is used as positive samples if they have an initial fire probability $\geq 0.5$ and from those that have initial fire probability $\leq 0.1$ is used as negative training samples. Taking into account the heterogeneity in feature space due to land classes (Observation 5), different classification models are trained for each land cover class. The separate training of classifiers for different land classes allows handling the heterogeneity in significance of V2D and LID features based on the land cover type of the pixel. After the classifiers are trained, the v2d and lid score for each (pixel,time) is considered either high or low based on the probability assigned ($>0.5$ or $\leq 0.5$)) by the logistic regression classifier trained for the corresponding land cover class.

Assigning fire probability Using the classifier, some embodiments assign the v2d and lid scores for each pixel as high (1) or low (0). The full probabilistic model in FIG. 6 is then used to compute the probability of fire for each candidate event cluster in step 308. As discovered by the present inventors, including the information on significance of v2D and lid scores further reduces both the false positives and false negatives. This is because some of the event clusters show presence of AF along with a synchronized v2d and lid local change point by random chance and get a high initial fire probability. However, they fail to get significant v2d and lid scores and in step 308 such spurious candidates get a low event probability. Similarly, some of the event clusters did not have their v2d and lid local change points synchronized due to the uncertain nature of data but their v2d and lid scores are significant hence they get a high fire event probability in step 308.

Event refinement In the event refinement steps 312 and 314, candidate events with a high posterior fire probability ($\geq 0.5$) are updated, i.e. pixels get added to or removed from the event, to correct the errors in the input events. As an example, see FIG. 5(b), where AF is used as the input candidate events. As shown in FIG. 5(b), AF misses big parts of the fire event. To improve coverage, in step 312, a pixel that is not part of any event but is spatially adjacent to a candidate event becomes part of that event if it has a high posterior probability of being part of a fire event ($\geq 0.5$) based on its individual features (AF, V2D, LID, TV and TL) using the fire probability model. Similarly, if an input candidate event has some member pixels that have a very low probability of being part of a fire event ($<0.5$) based on its individual features (AF, V2D, LID, TV and TL) such pixels are removed from the event at step 314. Steps 312 and 314 are iterated to allow spatially adjacent pixels to get added/removed till convergence when no new pixels are added or removed. FIG. 5(d) shows the output of each iteration of event refinement steps 312 and 314 on the candidate event as it adds missed pixels (shown in cross-hatched area 520) and removes spurious pixels (shown in dark shading such as areas 522 and 524). The present inventors have found that these event refinement steps reduce both types of errors—false negatives and false positives.

Precision vs recall trade-off In some embodiments, a candidate event is considered to be burned if it has a high posterior probability of ($\geq 0.5$) assigned to it by the model. Similarly, only candidate events with posterior probability of ($\geq 0.5$) are updated using event refinement step 312 in which spatial neighbors with posterior probability of ($\geq 0.5$) can join the events. These thresholds determine the number of pixels being assigned to burned class and hence controls the trade-off between the precision and recall of the framework. In some embodiments, the choice of these thresholds is altered to change the precision/recall trade-off. For example, if the goal is to only see a sample of highly confident fires (say for collecting training data for a supervised scheme), we can use a higher threshold to ensure a high precision. On the other hand, if the objective is to ensure a high coverage, a lower threshold value can be used. In some embodiments, a threshold of 0.5 is used.

There are two important properties of some of the embodiments—(1) some of the embodiments assume that the features being used for burned area classification are heterogeneous, uncertain and only weakly related to the burned class and (2) some of the embodiments leverage spatial context and classifies regions instead of individual pixels.

Figure 7:
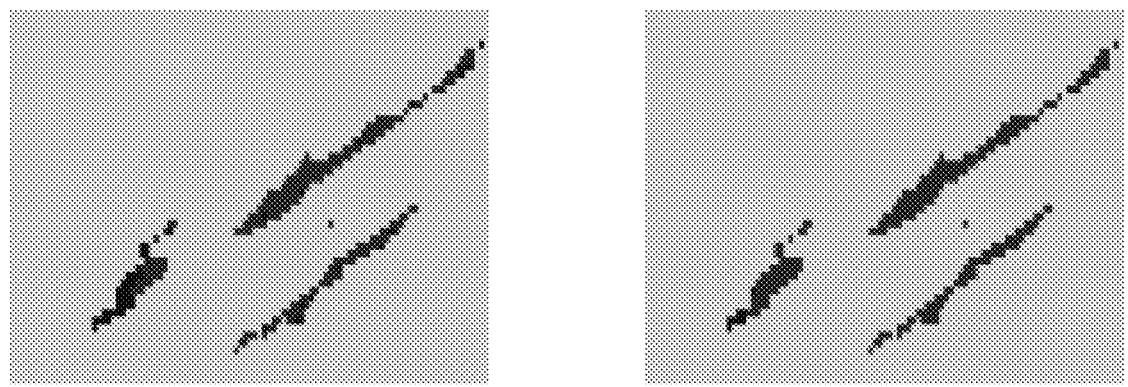
FIG. 7 shows candidate burn events using a Markov Random Field model.

To handle the uncertainty of data, some embodiments use a probabilistic graphical model. Probabilistic graphical modeling is an elegant framework that combines uncertainty and conditional dependence between random variables to represent complex, real-world phenomenon. It has been successfully used in several real applications with large uncertain data sets. In some embodiments, the probabilistic model for fire event probability captures the relationship between the observed variables and the fire class. The model, i.e. the conditional dependencies between variables was specified using domain understanding, and the parameters are estimated using maximum likelihood. One approach of probabilistic modeling for classification of spatial data is to use an undirected relationship between class labels of spatially adjacent pixels (i.e. a Markov Random Field model). However, since the MRF classification approach tends to smooth small-size fires as well as linear shaped fires that are only 1-2 pixels wide such as in FIG. 7, some embodiments use a new approach that leverages spatial context by examining events rather than using spatial smoothing. Some embodiments exploit event-level properties such as size of the event while computing fire probability which cannot be used by previous spatial prior based models.

Evaluation Setup

An evaluation of the various embodiments was performed in comparison with the existing MODIS products: Active Fire (AF; MOD14A2) and Burned Area (BA; MCD64A1) and Chen et al., A new data mining framework for forest fire mapping, 2012 Conference on Intelligent Data Understanding, pages 104-111, IEEE, 2012 (CIDU2012) in the states of California and Georgia in the United States and Yukon in Canada. These areas consist of diverse ecosystems with widely differing temporal variability, land cover types, geography and noise characteristics. In this section, the validation data used in this study is discussed, and an overview of the evaluation methodology that is used to quantitatively compare performance is provided.

Validation Data

For each region, fire validation data is obtained from government agencies responsible for monitoring and managing forests and wildfires. The validation data is in the form of fire perimeter polygons, each of which is associated with the time of burning. Note that although government agencies make their best effort in documenting historical fires, fire perimeter datasets are neither complete nor without error due to finite resources available to any agency. However, inaccuracies and incompleteness are represented only in a small portion of the validation data, and these datasets are still useful for quantitatively comparing methods which detect large-scale forest fires across large spatial regions.

Evaluation Methodology

The AF, BA and EVI datasets are georeferenced by the latitude and longitude values of their pixel centers. An event is considered to be positive if the corresponding pixel lies completely inside a polygon. Similarly, an event is considered to be unburned (forming the negative class) only if the entire pixel is outside a polygon. Since inaccuracies in fire polygons often occur at their boundaries (due to reduced intensity of fires around the periphery), pixels that partially overlap polygon boundaries are discarded from the evaluation framework to avoid ambiguity. Precision, recall and F-measure are used as evaluation metrics for quantitatively comparing the performance of AF, BA, CIDU12 and the various embodiments. These are well-known metrics are used to evaluate the performance of classification algorithms under severe skew in class distribution.

EXPERIMENTS

Performance of Initial Fire Probability

The past techniques and the present embodiments are first evaluated based on their abilities to assign an initial fire probability to each candidate burned event (provided as part of input) using only AF and temporal texture. Temporal texture is a nonparametric property that relies only on the rank of the score value in its time series and therefore is less impacted by heterogeneity due to land cover classes and geographical regions. Hence it is possible to use this property to select the high confidence pixels for training classifiers for other features that are impacted by heterogeneity due to land cover classes and geographical regions to a far greater extent. The performance of step 304 is critical as it impacts selection of training pixels to learn classifiers on vegetation index difference scores which influence later steps. A poor precision will lead to a very noisy positive training sample which in turn would lead to poor training of classifiers. Similarly, a poor recall may completely miss events in some of the land cover classes and this may lead to no training data available for those classes.

TABLE 1

Performance at each step of the proposed algorithm in California(south)

| Algorithm | TP | FP | FN |
|---|---|---|---|
| Step 300 (AF) | 5736 | 10197 | 1346 |
| Step 304. | 4487 | 1731 | 2595 |
| Step 310. | 5373 | 1312 | 1709 |
| Step 312/314 | 5676 | 624 | 1406 |

Results of Step 1 Table 1 shows the true positives and false positives for input candidate data (AF) and that of events filtered after step 304. When AF is used as input candidates the precision of event set is only 36%, but this is significantly improved to 72% by step 304 using information from temporal property. These results indicate that step 304 is able to successfully identify which of the input candidate events are actual fire events and which are spurious candidates.

Coverage across land cover classes As discussed earlier, an important consideration for step 304 is that the embodiments should not completely miss events for some land cover classes. To investigate whether the embodiments are able to identify sufficient samples across different land classes, Table 2 reports the total number of fire pixels identified in step 304 compared to the total number of fire pixels. The ratio of these numbers is the coverage (recall) for each land cover class. Results show that for each land cover class that has a non-trivial number of events, step 304 identifies sufficiently many pixels and thus classifiers on V2D and LID scores (and any other features sent as input) can be learnt using the training samples selected after step 304. A careful look at the Table 2 shows that while the recall of step 304 is high for evergreen needle-leaf forests and woody savannas it is much less for closed and open shrublands. The vegetation change in shrublands is short lived and due to that it does not show a clear signal in V2D.

TABLE 2

Coverage in California(south) for each land class

| Landcover | Size | events | Step 300 | Step 304 | Step 310 | Step 312/314 |
|---|---|---|---|---|---|---|
| Evergreen Needleleaf | 35946 | 822 | 767 | 726 | 763 | 803 |
| Evergreen Broadleaf | 139 | 16 | 16 | 14 | 15 | 11 |
| Deciduous Needleleaf | 14 | 0 | 0 | 0 | 0 | 0 |
| Deciduous Broadleaf | 299 | 5 | 3 | 2 | 3 | 4 |
| Mixed Forests | 3271 | 134 | 127 | 120 | 127 | 129 |
| Closed Shrublands | 128608 | 1816 | 1309 | 636 | 1204 | 1233 |
| Open Shrublands | 541056 | 832 | 522 | 355 | 434 | 545 |
| Woody Savannas | 125297 | 3167 | 2835 | 2557 | 2763 | 2899 |
| Savannas | 6035 | 16 | 12 | 8 | 12 | 10 |
| Grasslands | 122692 | 213 | 83 | 41 | 70 | 63 |
| Permanent Wetlands | 108 | 0 | 0 | 0 | 0 | 0 |
| Croplands | 51081 | 31 | 19 | 14 | 15 | 15 |
| Urban | 21651 | 13 | 7 | 4 | 1 | 1 |
| Croplands2 | 2152 | 15 | 10 | 8 | 8 | 8 |
| Snow/Ice | 44 | 0 | 0 | 0 | 0 | 0 |
| Barren | 88349 | 0 | 0 | 0 | 0 | 0 |

Impact of Including VI Difference Scores

Table 1 showed that using information from AF together with the temporal texture property it is possible to distinguish between burned and unburned input candidate events. This was used to select training samples to learn classifiers for V2D and LID. In this section it is shown that including the classifier output on V2D and LID scores can further improve the model's ability to distinguish burned candidates from unburned candidates. Table 1 shows that for California region the number of true positives increases from 4,487 to 5,373 and number of false positives decreased from 1,731 to 1,312 in step 310. This shows that including the actual value of V2D and LID scores of member pixels does help to distinguish whether the candidate is a fire event or not. To understand land cover specific performance, Table 2 shows how number of identified burned pixels increase in step 310 across the different land cover types. Impact of event refinement The event refinement steps 312 and 314 allow the pixels in spatial neighborhood of existing high probability fire event candidates to join the event or pixels that are part of the event to leave the event. These steps are expected to decrease the false negatives by adding missed pixels and also reduce the false positives by removing unburned pixels from input candidate events. Table 1 shows that for California region the number of false negatives decrease from 1,709 to 1,406 and the number of false positives decrease from 1,312 to 624 after the event refinement steps 312 and 314. Table 2 shows how true positives increase after event refinement across the different land cover types.

Overall Performance

The results of the final output of the some embodiments four different regions are provided below. These regions were selected because they span significantly different geographical and climatic conditions as well as have high quality validation data available. Table 3 shows the evaluation for California, Georgia and Yukon. The various embodiments consistently have a precision between 90-95%. This is in contrast with BA which is impacted by poor precision of input AF in California(south) and Georgia and therefore has poor precision in these regions. The recall of the various embodiments is also comparable or higher compared to other schemes. The only exception being California(south) where the various embodiments have a recall of 80% compared to 95% of BA. This is because of the fact that there are many shrub fires in southern California which impact vegetation for only a small duration and hence are difficult to detect in the 16 day Vegetation Index time series data. BA product that uses daily time series data has a good recall on these fire events and therefore has a better overall recall for California (south) compared to the proposed framework.

TABLE 3

Comparison with state-of-art

| Algorithm | Precision | Recall | F-measure |
|---|---|---|---|
| California (north) | | | |
| AF | | | |
| BA | 97 | 84 | 90 |
| CIDU | 100 | 73 | 84 |
| Embodiments | 91 | 98 | 94 |
| California (south) | | | |
| AF | 36 | 81 | 50 |
| BA | 75 | 95 | 84 |
| CIDU | 78 | 63 | 70 |
| Embodiments | 90 | 80 | 85 |
| Georgia | | | |
| AF | 12 | 64 | 21 |
| BA | 57 | 80 | 67 |
| CIDU | 98 | 60 | 75 |
| Embodiments | 95 | 80 | 87 |
| Yukon | | | |
| AF | 86 | 84 | 85 |
| BA | 96 | 99 | 97 |
| CIDU | 100 | 95 | 97 |
| Embodiments | 95 | 96 | 95 |

Robustness to Adding Noise in Candidate Events

A study of the robustness of the various embodiments to quality of input candidate events was performed by adding noise to input candidate fire events. The labels of p % of AF events were flipped thereby introducing false positives and false negatives in the input candidate set. Table 4 shows the final precision and recall as p is varied from 0 to 1.5%. The numbers in bracket correspond to the evaluation metric value of the input candidate set. In the table, as the precision of the input candidate event set goes down, the final precision and recall are stable. For example, using AF as input candidate set has a precision of 46% and the final output precision is 94% for California in the year 2005. When 1.5% of the AF labels are flipped, the precision of the input candidates (noisy AF) drops to 2%, however the final output precision is again 86%. Thus, the various embodiments are quite effective in pruning away randomly added spurious input candidate events.

TABLE 4

Impact of noise in California(south) for year 2005

| Noise percentage | Precision | Recall | F-measure |
|---|---|---|---|
| AF (orig.) | 94(46) | 93(89) | 94(61) |
| AF (0.02) | 94(32) | 93(89) | 94(47) |
| AF (0.06) | 94(16) | 93(89) | 93(27) |
| AF (1.50) | 86(02) | 93(89) | 89(04) |

Impact of Land Cover Heterogeneity

Observation 5 states that there exist heterogeneity in ecosystem data based on land cover and therefore the various embodiments learn different classification models for each land class. In this section performance of a land cover-specific model is compared with an embodiment that trains a single model for all land cover classes. Table 5 shows that embodiments that train a land cover specific classifier have improved precision in California.

TABLE 5

Land cover heterogeneity in California(south).

| Algorithm | Precision | Recall | F-measure |
|---|---|---|---|
| AF | 36 | 81 | 50 |
| Land cover specific Embod. | 90 | 80 | 85 |
| Global Embodiment | 83 | 81 | 82 |

Impact of Spatial Context

In this section, the role of spatial context in the various embodiments is discussed. In particular, an embodiment using an event-centric fire probability model is compared with an embodiment that ignores spatial relationships between pixels and therefore assigns probability to each pixel independently. Table 6 shows that assigning probability at event level plays a significant role in improving performance over pixel-based approaches. In particular, the event-centric approach has a higher recall compared to pixel-based approach as the event-centric approach assign fire probability by looking at evidence from all member pixels of an event together. The advantage of event refinement in region-based approaches over pixel-based approaches is that a lower posterior probability threshold can be used to keep a pixel as part of a high probability event (as it is spatially near high posterior probability events) without risking a lot of spurious burned pixels.

TABLE 6

Region-based vs pixel-based

| Algorithm | Precision | Recall | F-measure |
|---|---|---|---|
| California | | | |
| Pixel-based Emb. | 81 | 71 | 75 |
| Event-based Emb. | 90 | 80 | 85 |
| Georgia | | | |
| Pixel-based Emb. | 83 | 61 | 71 |
| Event-based Emb. | 95 | 80 | 87 |

Using BA as Input

In the various embodiments discussed above, AF was used as an input candidate set. In other embodiments, BA products are used as an input candidate event set.

Table 7 compares the performance of BA alone and using BA as an input to the various embodiments. As shown, there is a significant improvement in the precision in the various embodiments over BA alone—precision of California increases by 18% and of Georgia by 43%. Despite the overall high recall of BA in most places, there is an increase in recall of Georgia (from 80% to 86%). However, there is a loss of recall in California (goes down from 95% to 85%) due to the shrubland fires.

TABLE 7

Using BA as input candidate set.

| Algorithm | Precision | Recall | F-measure |
|---|---|---|---|
| California | | | |
| BA | 75 | 95 | 84 |
| BA embodiment | 93 | 85 | 89 |
| Georgia | | | |
| BA | 57 | 80 | 67 |
| BA embodiment | 100 | 86 | 93 |

What if the Input Candidates Events are not Spatially Contiguous?

To determine the sensitivity of the various embodiments to receiving spatially contiguous candidate events as input, input candidate pixels with a probability p=0.5 were removed from the data set. Note that since pixels (and not complete events) are removed, the contiguity of input events is being broken. For p=0.5, there is a sharp reduction in the size of spatially contiguous clusters. Table 8 shows that by randomly removing AF with probability of 0.5, there is a reduction in recall of the input set from 81% (of original AF) to 51%. Since we are only reducing AF, the precision remains unchanged. The various embodiments are quite robust to getting spatially scattered, low recall input candidates and even with this low recall input event set it has a final precision and recall that is comparable to the precision and recall using original AF as input candidates (only a minor decrease in recall from 80% to 78%).

TABLE 8

Giving low recall input in California(south).

| Algorithm | Precision | Recall | F-measure |
|---|---|---|---|
| AF | 36 | 81 | 50 |
| Embodiments with AF | 90 | 80 | 85 |
| low recall AF | 37 | 51 | 43 |
| low recall input embod. | 90 | 78 | 83 |

Exemplary Computing Device

Figure 8:
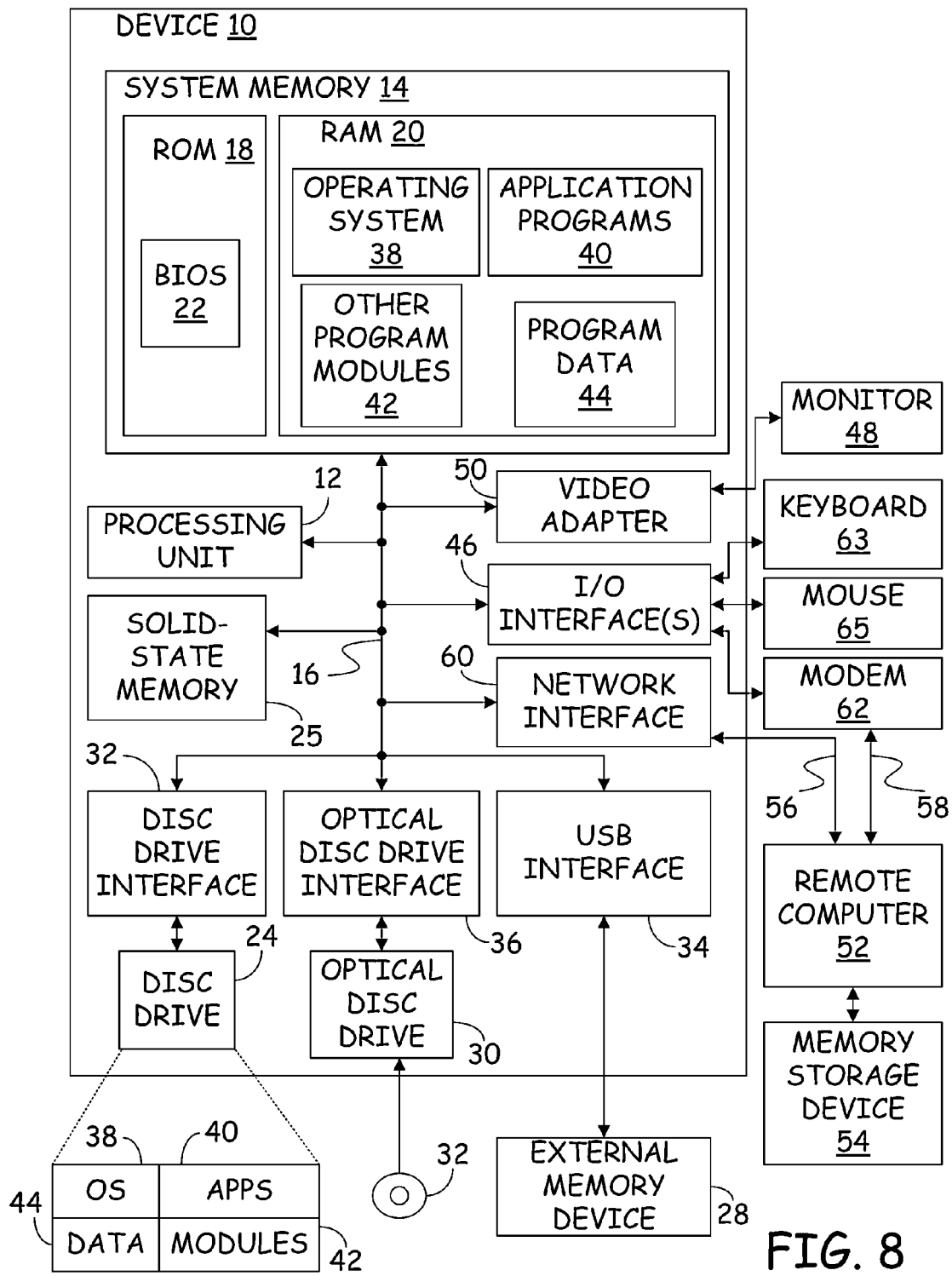
FIG. 8 provides a block diagram of a computing system that can be used to implement the various embodiments.

An example of a computing device 10 that can be used as a server and/or client device in the various embodiments is shown in the block diagram of FIG. 8. For example, computing device 10 may be used to perform any of the steps described above. Computing device 10 of FIG. 8 includes a processing unit (processor) 12, a system memory 14 and a system bus 16 that couples the system memory 14 to the processing unit 12. System memory 14 includes read only memory (ROM) 18 and random access memory (RAM) 20.

A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 8. The network connections depicted in FIG. 8 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 8 are exemplary and other means for establishing a communications link between the computers, such as a wireless interface communications link, may be used.

CONCLUSION

The various embodiments provide an unsupervised spatio-temporal framework for burned area mapping from remote sensing data. Evaluations of these embodiments using high quality validation data showed that the various embodiments improve the state-of-art in generating high quality, historical burned area maps with no supervision. This work is an important step towards developing data mining approaches to address the challenging task of burned area mapping from remote sensing data.

The embodiments provide a completely unsupervised framework and can detect fires with high precision (90-95%) and recall (80-95%) in diverse geographic areas and land cover types.

The embodiments above improve the operation of computing devices used to label satellite sensor data by removing the need to perform an exhaustive search for candidate burn areas. Such exhaustive searches require huge amount of processing time. By removing the need for such searches, embodiments described above improve the operation of the computing device when attempting to apply labels to satellite sensor data. In addition, embodiments above overcome a lack of sufficient training data for training classifiers that can classify pixels as being part of a burn event. By identifying an initial cluster of pixels as a burn event and using that initial cluster as training data for training the classifiers, the embodiments make a sensor data labelling computing device possible where it would not have been possible in the past. Lastly, the embodiments improve the operation of the computing devices used to label satellite sensor data by allowing those computing device to more accurately apply such labels to the satellite sensor data.

Although elements have been shown or described as separate embodiments above, portions of each embodiment may be combined with all or part of other embodiments described above.

Although the present invention has been described with reference to preferred embodiments, workers skilled in the art will recognize that changes may be made in form and detail without departing from the spirit and scope of the invention.

What is claimed is:

1. A method of reducing processing time required to identify locations burned by fire, the method comprising:
receiving a feature value for each pixel in an image, each pixel representing a sub-area of a location;
grouping pixels based on similarities of the feature values to form candidate burn events;

for each candidate burn event, determining a probability that the candidate burn event is a true burn event based on at least one further feature value for each pixel in the candidate burn event; and removing candidate burn events that have a probability below a threshold from further consideration as burn events to produce a set of remaining candidate burn events.

2. The method of claim 1 wherein after grouping pixels into candidate burn events, identifying a subset of the candidate burn events to use to train at least one classifier based on at least one other feature value.

3. The method of claim 2 wherein identifying candidate burn events to use to train at least one classifier comprises determining an initial probability of each candidate burn event and selecting the candidate burn events that have an initial probability above a training threshold.

4. The method of claim 3 wherein determining an initial probability for a candidate burn event comprises using the feature value used to group the pixels and an additional feature value.

5. The method of claim 4 wherein the additional feature value is a temporal texture feature value.

6. The method of claim 2 wherein determining the probability that a candidate burn event is a true burn event comprises using a classification provided by the at least one classifier trained from the subset of candidate events.

7. The method of claim 1 wherein after removing candidate burn events, determining a probability for each pixel in the set of remaining candidate burn events and removing pixels that have a probability below a pixel threshold from the set of remaining candidate burn events.

8. The method of claim 1 wherein after removing candidate burn events, determining a probability for each pixel neighboring a remaining candidate burn event, and adding pixels that have a probability above the pixel threshold to the set of remaining candidate burn events.

9. A method of identifying which pixels in a satellite image are part of a burn event, the method comprising:
receiving an initial grouping of pixels that groups pixels into at least one candidate burn event, wherein each pixel in a candidate burn event is considered to be part of a contiguous burned area;
assigning an initial fire probability to each candidate burn event based on at least one input feature of the pixels grouped in each candidate burn event;
using the initial fire probabilities to select training burn events to train a classifier;
training the classifier based on at least one additional input feature for each pixel of the training burn events to form a trained classifier;
using the trained classifier to assign a refined fire probability to each candidate burn event; and
removing candidate burn events that have a refined fire probability below a threshold to form a refined set of candidate burn events.

10. The method of claim 9 further comprising:
identifying neighboring pixels next to a candidate burn event in the refined set of candidate burn events;
using the trained classifier to assign a refined fire probability to the identified neighboring pixels;
adding identified neighboring pixels with a refined fire probability above a threshold to the candidate burn event that the identified neighboring pixel is next to.

11. The method of claim 10 further comprising:
determining a refined fire probability for each pixel in a candidate burn event of the refined set of candidate burn events; and
removing pixels from the candidate burn event that have a refined fire probability that is below a threshold.

12. The method of claim 9 wherein training a classifier comprises training a plurality of classifiers with a separate classifier for different land classes.

13. The method of claim 12 wherein training a plurality of classifiers comprises training multiple classifier for each different land class, wherein each classifier for a land class uses a different input feature.

14. The method of claim 9 wherein the initial grouping of pixels is formed based on the at least one input feature.

15. A system comprising:
a memory containing initial groupings of pixels into candidate burn events;
a processor:
assigning an initial fire probability to each candidate burn event based on a subset of features;
using the initial fire probabilities to train land cover-specific classifiers;
using the trained land cover-specific classifiers to assign a refined fire probability to each candidate burn event; and
removing candidate burn events that have a refined fire probability below a threshold to form a refined set of candidate burn events.

16. The system of claim 15 wherein the processor performs further steps comprising:
identifying neighboring pixels next to a candidate burn event in the refined set of candidate burn events;
using the trained land-cover specific classifiers to assign a refined fire probability to the identified neighboring pixels;
adding identified neighboring pixels with a refined fire probability above a threshold to the candidate burn event that the identified neighboring pixel is next to.

17. The system of claim 16 wherein the processor performs further steps comprising:
determining a refined fire probability for each pixel in a candidate burn event of the refined set of candidate burn events; and
removing pixels from the candidate burn event that have a refined fire probability that is below a threshold.

18. The system of claim 15 wherein training train land cover-specific classifiers comprises training multiple land cover-specific classifier for each different land class, wherein each classifier for a land class uses a different input feature.

19. The system of claim 15 wherein the initial grouping of pixels is formed based on at least one feature in the subset of features.

20. The system of claim 15 wherein the refined fire probability is based on the subset of features.

21. A method of reducing processing time required to identify locations of an event, the method comprising:
receiving a feature value for each pixel in an image, each pixel representing a sub-area of a location;
grouping pixels based on similarities of the feature values to form candidate events;
for each candidate event, determining a probability that the candidate event is a true event based on at least one further feature value for each pixel in the candidate event; and removing candidate events that have a probability below a threshold from further consideration as events to produce a set of remaining candidate events.

22. The method of claim 21 wherein after grouping pixels into candidate events, identifying a subset of the candidate events to use to train at least one classifier based on at least one other feature value.

23. The method of claim 22 wherein determining the probability that a candidate event is a true event comprises using a classification provided by the at least one classifier trained from the subset of candidate events.

24. The method of claim 22 wherein after removing candidate events, determining a probability for each pixel in the set of remaining candidate events and removing pixels that have a probability below a pixel threshold from the set of remaining candidate events.

25. The method of claim 21 wherein after removing candidate events, determining a probability for each pixel neighboring a remaining candidate event, and adding pixels that have a probability above the pixel threshold to the set of remaining candidate events.

26. A method of identifying which pixels in a satellite image are part of an event, the method comprising:
receiving an initial grouping of pixels that groups pixels into at least one candidate event;
assigning an initial fire probability to each candidate event based on at least one input feature of the pixels grouped in each candidate event;
using the initial fire probabilities to select training events to train a classifier;
training the classifier based on at least one additional input feature for each pixel of the training events to form a trained classifier;
using the trained classifier to assign a refined probability to each candidate event; and
removing candidate events that have a refined probability below a threshold to form a refined set of candidate events.

27. The method of claim 26 further comprising:
identifying neighboring pixels next to a candidate event in the refined set of candidate events;
using the trained classifier to assign a refined probability to the identified neighboring pixels; and
adding identified neighboring pixels with a refined probability above a threshold to the candidate event that the identified neighboring pixel is next to.

28. The method of claim 27 further comprising:
determining a refined probability for each pixel in a candidate event of the refined set of candidate events; and
removing pixels from the candidate event that have a refined probability that is below a threshold.

29. The method of claim 26 wherein training a classifier comprises training a plurality of classifiers with a separate classifier for different land classes.

30. A system comprising:
a memory containing initial groupings of pixels into candidate events;
a processor:
assigning an initial probability to each candidate event based on a subset of features;
using the initial probabilities to train land cover-specific classifiers;
using the trained land cover-specific classifiers to assign a refined probability to each candidate event; and
removing candidate events that have a refined probability below a threshold to form a refined set of candidate events.

31. The system of claim 30 wherein the processor performs further steps comprising:
identifying neighboring pixels next to a candidate event in the refined set of candidate events;
using the trained land-cover specific classifiers to assign a refined probability to the identified neighboring pixels; and
adding identified neighboring pixels with a refined probability above a threshold to the candidate event that the identified neighboring pixel is next to.

32. The system of claim 31 wherein the processor performs further steps comprising:
determining a refined probability for each pixel in a candidate event of the refined set of candidate events; and
removing pixels from the candidate event that have a refined probability that is below a threshold.

* * * * *